(12) United States Patent
Qiu et al.

(10) Patent No.: US 12,479,265 B2
(45) Date of Patent: Nov. 25, 2025

(54) AIR VOLUME CONTROL METHOD AND APPARATUS FOR WORKING MACHINE COCKPIT

(71) Applicant: SHANGHAI SANY HEAVY MACHINERY CO., LTD, Shanghai (CN)

(72) Inventors: Cong Qiu, Shanghai (CN); Chuanyu Wang, Shanghai (CN); Xuefeng Ji, Shanghai (CN)

(73) Assignee: SHANGHAI SANY HEAVY MACHINERY CO., LTD, Shanghai (CN)

( * ) Notice: Subject to any disclaimer, the term of this patent is extended or adjusted under 35 U.S.C. 154(b) by 121 days.

(21) Appl. No.: 18/562,087

(22) PCT Filed: Mar. 21, 2022

(86) PCT No.: PCT/CN2022/082047
§ 371 (c)(1),
(2) Date: Nov. 17, 2023

(87) PCT Pub. No.: WO2022/247411
PCT Pub. Date: Dec. 1, 2022

(65) Prior Publication Data
US 2024/0227492 A1    Jul. 11, 2024

(30) Foreign Application Priority Data
May 26, 2021 (CN) .......................... 202110580615.6

(51) Int. Cl.
*B60H 1/00* (2006.01)

(52) U.S. Cl.
CPC ..... *B60H 1/00357* (2013.01); *B60H 1/00742* (2013.01); *B60H 1/00785* (2013.01); *B60H 1/00828* (2013.01)

(58) Field of Classification Search
CPC ............ B60H 1/00357; B60H 1/00742; B60H 1/00785; B60H 1/00828; F25B 2500/19
See application file for complete search history.

(56) References Cited

U.S. PATENT DOCUMENTS 5,170,935 A * 12/1992 Federspiel ............... F24F 11/63
236/94
5,518,065 A * 5/1996 Asou .................. B60H 1/00864
236/91 R
(Continued)

FOREIGN PATENT DOCUMENTS

CN         104833063 A     8/2015
CN         109297153 A     2/2019
(Continued)

OTHER PUBLICATIONS

CN Office Action dated Jun. 24, 2022 as received in Application No. 202110580615.6.
(Continued)

*Primary Examiner* — Jonathan Bradford
(74) *Attorney, Agent, or Firm* — Maschoff Brennan (57) ABSTRACT

An air volume control method for a working machine cockpit. The method includes: acquiring a real-time environment physical parameter, and acquiring a current air volume parameter; determining real-time heat comfort information on the basis of the real-time environment physical parameter and the current air volume parameter; acquiring target heat comfort information; and determining a target air volume parameter on the basis of the real-time heat comfort information, the target heat comfort information, and the current air volume parameter.

8 Claims, 4 Drawing Sheets

(56) References Cited

U.S. PATENT DOCUMENTS

2017/0370596 A1  12/2017  Lee
2021/0078382 A1   3/2021  Maeng et al.

FOREIGN PATENT DOCUMENTS

| | | |
|---|---|---|
| CN | 110991478 A | 4/2020 |
| CN | 111444943 A | 7/2020 |
| CN | 111597723 A | 8/2020 |
| CN | 111619308 A | 9/2020 |
| CN | 111674228 A | 9/2020 |
| CN | 112254287 A | 1/2021 |
| CN | 113276622 A | 8/2021 |
| JP | 2018-135614 A | 8/2018 |
| JP | 2020-134124 A | 8/2020 |
| KR | 10-0727352 B1 | 6/2007 |
| KR | 10-1905697 B1 | 10/2018 |

OTHER PUBLICATIONS

International Search Report and Written Opinion of the International Searching Authority dated Jun. 27, 2022 as received in Application No. PCT/CN2022/082047.
CN Decision to Grant Dated Oct. 9, 2022 as received in Application No. 202110580615.6.

* cited by examiner

AIR VOLUME CONTROL METHOD AND APPARATUS FOR WORKING MACHINE COCKPIT

CROSS REFERENCE TO RELATED APPLICATION

This application claims priority of Chinese Patent Application No. 202110580615.6, entitled "Air Volume Control Method and Apparatus for Working Machine Cockpit", filed on May 26, 2021, which is hereby incorporated by reference in its entirety.

TECHNICAL FIELD

The present application relates to the field of intelligent control technology, in particular to an air volume control method and apparatus for a working machine cockpit.

BACKGROUND

Working machines, such as excavators, cranes and loaders for example, often work in complex and harsh outdoor environments. A driver needs to sit in a cockpit for a long time and carry out operations there, and when he works in a hot outdoor environment, the cockpit is directly exposed to sunlight for a long time, at a very high temperature, so it needs to use an air supply device such as a vehicle-mounted fan and a vehicle-mounted air conditioner to implement cooling and heat dissipation.

At present, air volume of an air supply device of a working machine cockpit is generally adjusted by manual operation. For example, a user, in the working machine cockpit, rotates a knob on the air supply device to adjust the air volume, or a user operates a remote control to control the air volume of the air supply device of the working machine cockpit remotely. However, in such a solution in the prior art, the control of the air supply volume is inflexible and unitary, and the precision and flexibility of the control of the air supply volume are low.

SUMMARY OF THE INVENTION

Provided in the present application are an air volume control method and apparatus for a working machine cockpit, to solve the problem in the prior art that the control of an air supply volume is inflexible and unitary, and the precision and flexibility of the control of the air supply volume are low, so as to realize automatic control of the air volume, such that the air volume better conforms to actual heat comfort requirements of a human body, thereby improving the accuracy and flexibility of controlling an air supply volume.

Provided in the present application is an air volume control method for a working machine cockpit. The air volume control method for a working machine cockpit includes: acquiring a real-time environment physical parameter, and acquiring a current air volume parameter; determining real-time heat comfort information on the basis of the real-time environment physical parameter and the current air volume parameter; acquiring target heat comfort information; and determining a target air volume parameter on the basis of the real-time heat comfort information, the target heat comfort information, and the current air volume parameter.

In the air volume control method for a working machine cockpit provided in the present application, determining a target air volume parameter on the basis of the real-time heat comfort information, the target heat comfort information, and the current air volume parameter includes: using the real-time heat comfort information, the target heat comfort information, and the current air volume parameter to search a parameterized heat comfort database to obtain the target air volume parameter corresponding to a combination of the real-time heat comfort information, the target heat comfort information, and the current air volume parameter.

In the air volume control method for a working machine cockpit provided in the present application, determining a target air volume parameter on the basis of the real-time heat comfort information, the target heat comfort information, and the current air volume parameter includes: inputting the real-time heat comfort information, the target heat comfort information, and the current air volume parameter into a parameterized heat comfort model to output the target air volume parameter, wherein the parameterized heat comfort model is obtained by training, in advance, using sample real-time heat comfort information, sample target heat comfort information, and a sample current air volume parameter as samples, and using target air volume parameter sample data corresponding to a combination of the sample real-time heat comfort information, the sample target heat comfort information, and the sample current air volume parameter as a sample label.

In the air volume control method for a working machine cockpit provided in the present application, acquiring target heat comfort information includes: receiving a first input from a user; and determining the target heat comfort information in response to the first input.

In the air volume control method for a working machine cockpit provided in the present application, the real-time environment physical parameter includes at least one of: a real-time temperature parameter, a real-time humidity parameter, a personnel heat load parameter, and a personnel clothing heat resistance parameter.

In the air volume control method for a working machine cockpit provided in the present application, acquiring a real-time environment physical parameter includes: acquiring the real-time temperature parameter by a temperature sensor; or acquiring the real-time humidity parameter by a humidity sensor; or acquiring a target area image by an image sensor, and determining the personnel heat load parameter or the personnel clothing heat resistance parameter on the basis of the target area image.

In the air volume control method for a working machine cockpit provided in the present application, the air volume control method for a working machine cockpit further includes: based on the target air volume parameter, controlling an air volume by controlling a fan by Pulse Width Modulation (PWM); or based on the target air volume parameter, controlling the air volume by controlling a resistance value of a resistor connected in series with a fan.

Also provided in the present application is an air volume control apparatus for a working machine cockpit. The air volume control apparatus for a working machine cockpit includes: a first acquisition module configured to acquire a real-time environment physical parameter, and acquire a current air volume parameter; a first determination module configured to determine real-time heat comfort information on the basis of the real-time environment physical parameter and the current air volume parameter; a second acquisition module configured to acquire target heat comfort information; and a second determination module configured to determine a target air volume parameter on the basis of the real-time heat comfort information, the target heat comfort information, and the current air volume parameter.

Also provided in the present application is an electronic device including a memory, a processor, and a computer program that is stored in the memory and executable by the processor, wherein when executing the computer program, the processor performs the steps of any air volume control method for a working machine cockpit as described above.

Also provided in the present application is a non-transitory computer-readable storage medium, configured to store a computer program therein, wherein the computer program, when executed by a processor, performs the steps of any air volume control method for a working machine cockpit as described above.

By means of the air volume control method and apparatus for a working machine cockpit provided in the present application, real-time heat comfort information is obtained by means of a real-time environment physical parameter, a target air volume parameter is determined according to the real-time heat comfort information, target heat comfort information and a current air volume parameter, and automatic control of an air volume can thus be realized, such that an air volume better conforms to actual heat comfort requirements of a human body, thereby improving the accuracy and flexibility of controlling an air supply volume.

BRIEF DESCRIPTION OF THE DRAWINGS

To more clearly describe technical solutions in the present application or in the prior art, a brief introduction to the drawings for use in description of embodiments or the prior art will be given below. Obviously, the drawings described below are some embodiments in the present application, and to those of ordinary skill in the art, other drawings may also be obtained based on these drawings without creative work.

DETAILED DESCRIPTION

To make the objects, technical solutions and advantages of the present application clearer, the technical solutions in the present application will be described below clearly and completely in conjunction with the drawings in the present application. Obviously, the embodiments described are part of, but not all of, the embodiments of the present application. All other embodiments obtained by those of ordinary skill in the art without creative work, based on embodiments in the present application, fall into the protection scope of the present application.

An air volume control method and apparatus for a working machine cockpit are discussed below in conjunction with FIGS. 1 to 5.

Figure 1:
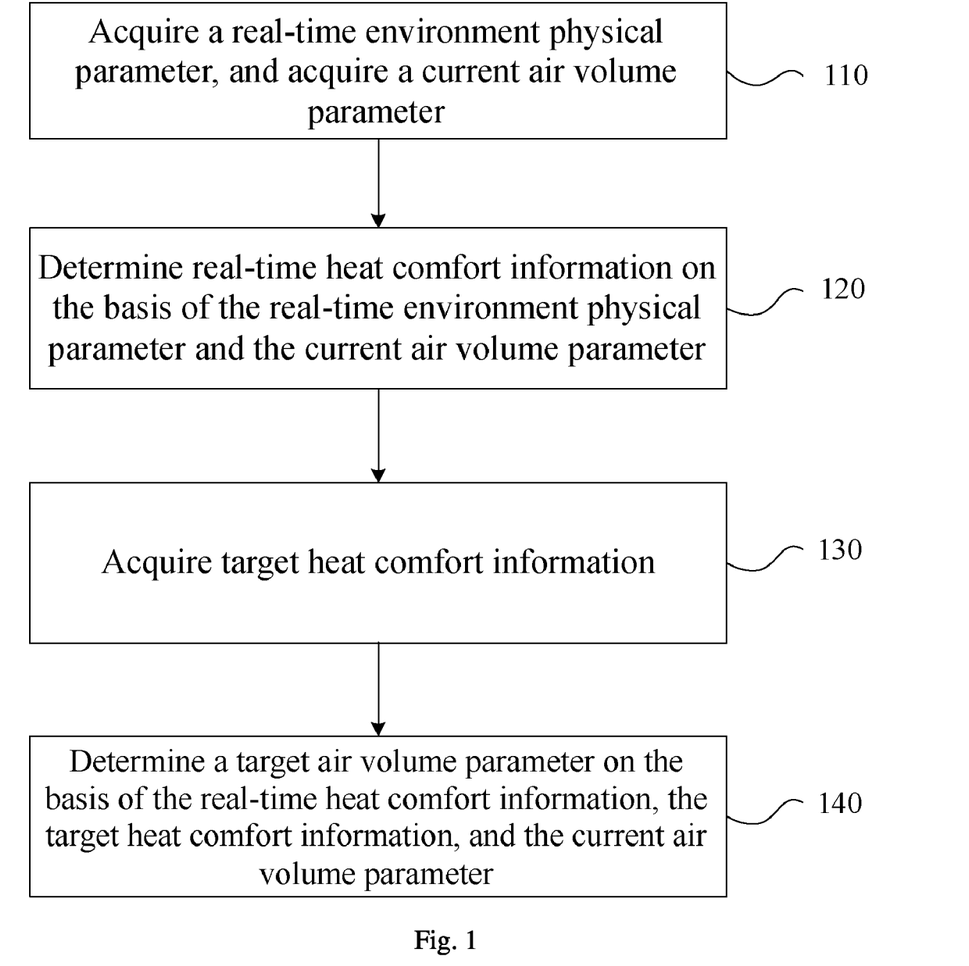
FIG. 1 is a flow diagram of an air volume control method for a working machine cockpit provided in the present application.

As shown in FIG. 1, provided in the present application is an air volume control method for a working machine cockpit. The air volume control method for a working machine cockpit includes steps 110 to 140 as follows.

Step 110, acquiring a real-time environment physical parameter, and acquiring a current air volume parameter.

It may be appreciated that the real-time environment physical parameter may be information about the environment around an air supply device. For example, it may be a temperature, humidity or number of people. Here, the real-time environment physical parameter may be measured by a sensor connected to a controller of the air supply device. The current air volume parameter may refer to an air velocity at which the air supply device supplies air to the outside at a current moment. The current air volume parameter may be measured by an air volume sensor connected to the controller. The air volume sensor may be provided in an air duct of the air supply device.

Step 120, determining real-time heat comfort information on the basis of the real-time environment physical parameter and the current air volume parameter.

It may be appreciated that heat comfort is a subjective satisfaction evaluation made by a person about a surrounding thermal environment (ISO 7730). Three aspects are involved in analyzing whether a thermal environment is comfortable: First, in a physical aspect: the influence of the environment on human body comfort and conditions to meet human body comfort are analyzed according to a heat balance relationship between heat generated by activities of a human body and a heat loss of the clothed human body under the action of the external environment. Second, in a physiological aspect: the human body's physiological responses to hot and cold stresses such as skin temperature, skin humidity, perspiration rate, blood pressure and body temperature are studied, and a comfort level of the environment is determined by using the physiological responses. Third, in a psychological aspect: subjective sensations of a person in the thermal environment are analyzed, and coldness/hotness and comfort levels of the environment are determined by using a psychological method. Due to the complexity of factors and conditions that influence heat comfort of a human body, a number of indicators for evaluating heat comfort, and heat comfort ranges have been put forward one after another by considering interactions of different factors, after numerous experimental studies since the 1920s.

Bedford proposed 7-level evaluation indicators for heat comfort in 1936. The indicators for heat comfort are: cold, cool, comfortably cool (slightly cold), comfortable and not cold or hot (comfortable), comfortably warm (slightly hot), warm, and hot. Heat comfort information may be presented in the form of numerical values. Specific heat comfort information and corresponding thermal sensations of a human body may be presented in the following table:

TABLE 1

Table of heat comfort values

| Thermal sensation | Heat comfort information | Objective physiological response |
|---|---|---|
| Hot | +3 | With sweat droplets |
| Warm | +2 | With sweat droplets on parts of hands, the neck, and the forehead |
| Slightly hot | +1 | Feel hot; the skin is the sticky and moist |
| Comfortable | 0 | Feel comfortable; the skin is dry |
| Slightly cold | −1 | Feel cold in parts of joints, but tolerable |

TABLE 1-continued

Table of heat comfort values

| Thermal sensation | Heat comfort information | Objective physiological response |
|---|---|---|
| Cool | −2 | Feel discomfortable in parts; clothing addition is needed |
| Cold | −3 | Very cold; with goose bumps and shivers |

Figure 2:
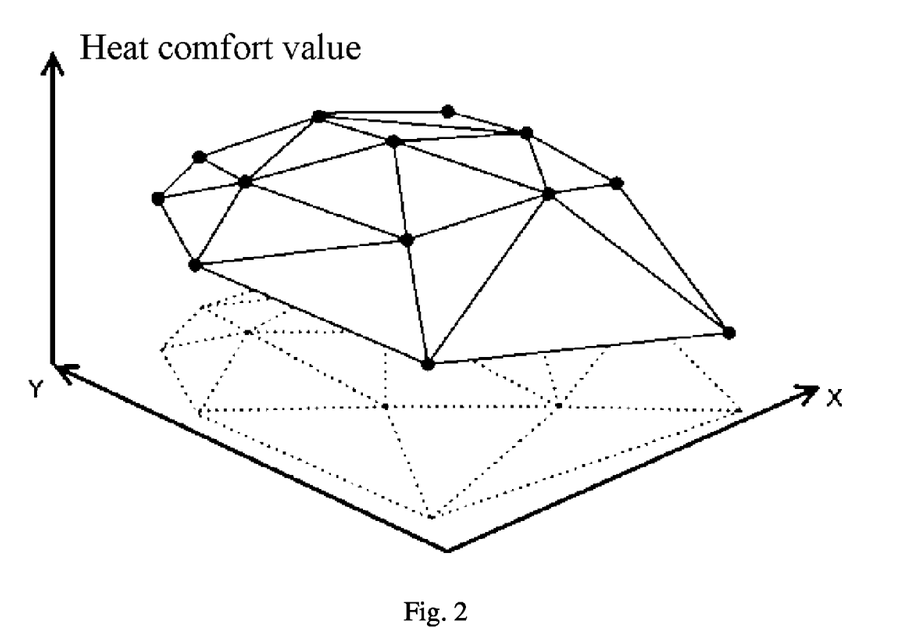
FIG. 2 is a structural diagram of a heat comfort information database in an air volume control method for a working machine cockpit provided in the present application.

Here, the heat comfort information may be obtained according to a pre-stored correspondence relationship between heat comfort information, and real-time physical information and a current air volume parameter. For example, a heat comfort information database may be pre-stored in the controller. As shown in FIG. 2, the heat comfort information database may have a MAP relational structure. A correspondence relationship between heat comfort information, and real-time physical information and a current air volume parameter is provided in the heat comfort information database. Real-time physical information may be used to search the heat comfort information database to find corresponding heat comfort information.

It is worth mentioning that the real-time physical information and the current air volume parameter may not be in a one-to-one correspondence relationship with the heat comfort information, and various sets of real-time physical information may correspond to same heat comfort information. For example, a temperature of 9 degrees Celsius, a humidity of 40%, an air velocity of 800 rpm of the air supply device, and 5 persons in the room where the air supply device is located may correspond to the comfort information "slightly cold", and a temperature of 12 degrees Celsius, a humidity of 30%, an air velocity of 1000 rpm of the air supply device, and 7 persons in the room where the air supply device is located may also correspond to the comfort information "slightly cold".

It is worth noting that working machines, such as excavators, cranes and loaders for example, often work in complex and harsh outdoor environments. A driver needs to sit in a cockpit for a long time and carry out operations there, and when he works in a hot outdoor environment, the cockpit is directly exposed to sunlight for a long time, at a very high temperature, so it needs to use an air supply device such as a vehicle-mounted fan and a vehicle-mounted air conditioner to implement cooling and heat dissipation.

The inventors found during research and development that in current methods for regulating an air volume of an air supply device of a working machine, an air supply volume is controlled mainly according to an external temperature. Such a method is relatively inflexible and unitary, without considering actual feelings of a driver. For a driver who needs to carry out a working task in a cockpit of a working machine for a long time, such a method for adjusting an air volume directly according to temperature cannot adapt to the driver's physical sensations, such that the driver cannot work at an optimal level of comfort, which affects the work efficiency.

Here, the comfort information is proposed as a basis for determining a target air volume parameter, and is designed based on a user's actual experience. Compared with other parameters, it is more related to the user's actual experience, rather than inflexibly and unitarily taking an external environment value.

Step 130: acquiring target heat comfort information.

It may be appreciated that the target heat comfort information is a level of heat comfort expected to be achieved. The target heat comfort information is, for that moment, most friendly to the human body's heat comfort level. The human body's experience is more comfortable at this level of heat comfort.

The target heat comfort information may be pre-stored in a system of the controller, or may be set by the user according to the current actual situation, which is not specifically limited here.

Step 140: determining a target air volume parameter on the basis of the real-time heat comfort information, the target heat comfort information, and the current air volume parameter.

It may be appreciated that the target air volume parameter may be obtained by a single solution according to the real-time heat comfort information, the target heat comfort information, and the current air volume parameter, and an air volume value corresponding to the target air volume parameter is an optimal air volume that best meets the requirement at that time.

Here, the target air volume parameter may be determined by using a pre-stored parameterized comfort database, or the target air volume parameter may also be obtained by using a pre-trained neural network model, which is not limited in this embodiment. A person skilled in the art may select a specific algorithm according to the actual situation to implement the determination of the target air volume parameter according to the real-time heat comfort information, the target heat comfort information, and the current air volume parameter.

By means of the air volume control method for a working machine cockpit provided in the present application, real-time heat comfort information is obtained by means of a real-time environment physical parameter, a target air volume parameter is determined according to the real-time heat comfort information, target heat comfort information and a current air volume parameter, and automatic control of an air volume can thus be realized, such that the air volume better conforms to actual heat comfort requirements of a human body, thereby improving the accuracy and flexibility of controlling an air supply volume.

In some embodiments, determining a target air volume parameter on the basis of the real-time heat comfort information, the target heat comfort information, and the current air volume parameter includes: using the real-time heat comfort information, the target heat comfort information, and the current air volume parameter to search a parameterized heat comfort database to obtain the target air volume parameter corresponding to a combination of the real-time heat comfort information, the target heat comfort information, and the current air volume parameter.

It may be appreciated that the parameterized heat comfort database may be a pre-constructed database that stores a correspondence relationship between real-time heat comfort information, target heat comfort information and a current air volume parameter, and a target air volume parameter, and the user may search the database by using the real-time heat comfort information, the target heat comfort information, and the current air volume parameter to find the corresponding target air volume parameter. This can improve the efficiency of acquiring the target air volume parameter.

In some embodiments, determining a target air volume parameter on the basis of the real-time heat comfort information, the target heat comfort information, and the current air volume parameter includes: inputting the real-time heat comfort information, the target heat comfort information, and the current air volume parameter into a parameterized heat comfort model to output the target air volume parameter, It may be appreciated that the parameterized heat comfort model may be a model constructed based on a neural network, which may be a convolutional neural network or a residual neural network, for example. The parameterized heat comfort model may be subjected to machine learning. The parameterized heat comfort model may be trained in advance, and the trained parameterized heat comfort model may be used for computation.

The parameterized heat comfort model is obtained by training, in advance, using sample real-time heat comfort information, sample target heat comfort information, and a sample current air volume parameter as samples, and using target air volume parameter sample data corresponding to a combination of the sample real-time heat comfort information, the sample target heat comfort information, and the sample current air volume parameter as a sample label.

It may be appreciated that the target air volume parameter sample data corresponding to a combination of the sample real-time heat comfort information, the sample target heat comfort information, and the sample current air volume parameter as a sample label may be a large amount of real sample data, and using the real sample data to train the parameterized heat comfort model enables the parameterized heat comfort model to improve the computational accuracy in the continuous learning process, so that the parameterized heat comfort model obtained finally can implement precise and efficient computation, and the computational precision and efficiency of the target air volume parameter are improved.

In some embodiments, acquiring target heat comfort information includes: receiving a first input from a user; and determining the target heat comfort information in response to the first input.

It may be appreciated that the target heat comfort information may be input by the user. The user may operate on a control panel, button or knob of the air supply device, and provide the first input by an operation such as tapping or triggering. The air supply device, after receiving the first input from the user, may respond to the first input to obtain the target heat comfort information.

The target heat comfort information is corresponding to the first input, i.e. selected by the user himself, such that the corresponding target air volume parameter is more in line with the user's expectation.

Figure 3:
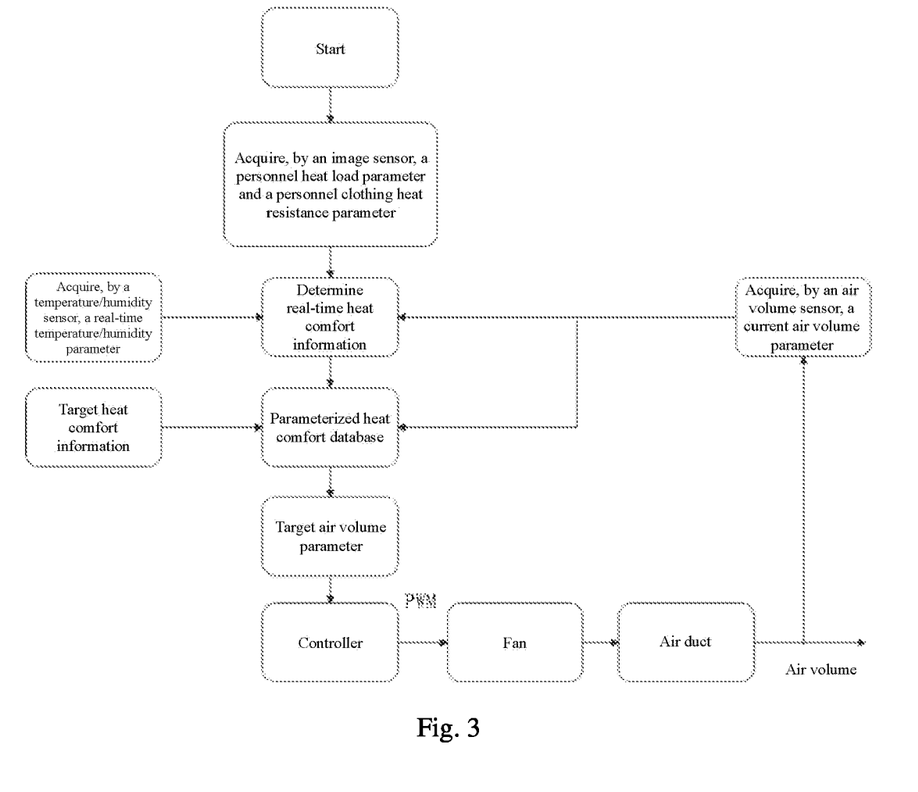
FIG. 3 is a principle diagram of an air volume control method for a working machine cockpit provided in the present application.

As shown in FIG. 3, in some embodiments, the real-time environment physical parameter includes at least one of: a real-time temperature parameter, a real-time humidity parameter, a personnel heat load parameter, and a personnel clothing heat resistance parameter.

It may be appreciated that the real-time temperature parameter is a real-time temperature value of the environment around the air supply device; the real-time humidity parameter is a real-time humidity value of the environment around the air supply device; the personnel heat load parameter may be used to indicate a heat dissipation requirement of personnel around the air supply device, and the personnel heat load parameter may be obtained according to the person number, height and weight information of the personnel around the air supply device; and the personnel clothing heat resistance parameter refers to a heat resistance value corresponding to clothing of the personnel around the air supply device.

The real-time temperature parameter, the real-time humidity parameter, the personnel heat load parameter, and the personnel clothing heat resistance parameter can all influence the person's heat comfort level. Using these parameters as a basis for the real-time heat comfort information, the real-time heat comfort information can be determined more accurately.

As shown in FIG. 3, in some embodiments, acquiring a real-time environment physical parameter includes: acquiring the real-time temperature parameter by a temperature sensor; or acquiring the real-time humidity parameter by a humidity sensor; or acquiring a target area image by an image sensor, and determining the personnel heat load parameter or the personnel clothing heat resistance parameter on the basis of the target area image.

It may be appreciated that the temperature sensor, the humidity sensor, and the image sensor may all be electrically connected to the controller of the air supply device, and the controller may correspondingly acquire the real-time temperature parameter, the real-time humidity parameter, the personnel heat load parameter, and the personnel clothing heat resistance parameter through the temperature sensor, the humidity sensor, and the image sensor.

It is worth mentioning that after the image sensor acquires the i.e., target area image, the controller may perform image recognition to determine the personnel heat load parameters or the personnel clothing heat resistance parameter.

In some embodiments, the air volume control method for a working machine cockpit further includes: based on the target air volume parameter, controlling an air volume by controlling a fan by Pulse Width Modulation (PWM); or based on the target air volume parameter, controlling the air volume by controlling a resistance value of a resistor connected in series with a fan.

It may be appreciated that after the target air volume parameter is acquired, the air volume may be controlled correspondingly by controlling a rotation speed of the fan by PWM. Of course, the fan may also be connected in series with a resistor having an adjustable resistance value, and the controller may control the magnitude of the resistance value, thereby achieving a voltage division effect on the fan and changing the rotation speed of the fan, to control the air volume.

An air volume control apparatus for a working machine cockpit provided in the present application is described below. For the air volume control apparatus for a working machine cockpit described below and the air volume control method for a working machine cockpit described above, reference may be made to each other correspondingly.

Figure 4:
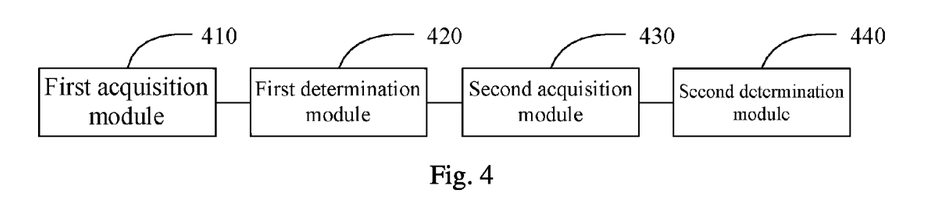
FIG. 4 is a structural diagram of an air volume control apparatus for a working machine cockpit provided in the present application.

As shown in FIG. 4, provided in the present application is an air volume control apparatus for a working machine cockpit. The air volume control apparatus for a working machine cockpit includes: a first acquisition module 410, a first determination module 420, a second acquisition module 430, and a second determination module 440.

The first acquisition module 410 is configured to acquire a real-time environment physical parameter, and acquire a current air volume parameter.

The first determination module 420 is configured to determine real-time heat comfort information on the basis of the real-time environment physical parameter and the current air volume parameter;

The second acquisition module 430 is configured to acquire target heat comfort information.

The second determination module 440 is configured to determine a target air volume parameter on the basis of the real-time heat comfort information, the target heat comfort information, and the current air volume parameter.

In some embodiments, the second determination module is further configured to, on the basis of the real-time heat comfort information, the target heat comfort information, and the current air volume parameter, search a parameterized heat comfort database to obtain the target air volume parameter corresponding to a combination of the real-time heat comfort information, the target heat comfort information, and the current air volume parameter.

In some embodiments, the second determination module is further configured to input the real-time heat comfort information, the target heat comfort information, and the current air volume parameter into a parameterized heat comfort model to output the target air volume parameter, The parameterized heat comfort model is obtained by training, in advance, using sample real-time heat comfort information, sample target heat comfort information, and a sample current air volume parameter as samples, and using target air volume parameter sample data corresponding to a combination of the sample real-time heat comfort information, the sample target heat comfort information, and the sample current air volume parameter as a sample label.

In some embodiments, the second acquisition module includes a first acquisition submodule and a second acquisition submodule.

The first acquisition submodule is configured to receive a first input from a user.

The second acquisition submodule is configured to determine the target heat comfort information in response to the first input.

In some embodiments, the real-time environment physical parameter includes at least one of: a real-time temperature parameter, a real-time humidity parameter, a personnel heat load parameter, and a personnel clothing heat resistance parameter.

In some embodiments, the first determination module is further configured to acquire the real-time temperature parameter by a temperature sensor; or acquire the real-time humidity parameter by a humidity sensor; or acquire a target area image by an image sensor; and determine the personnel heat load parameter or the personnel clothing heat resistance parameter on the basis of the target area image.

In some embodiments, the air volume control apparatus for a working machine cockpit further includes: a first control module or a second control module.

The first control module is configured to, based on the target air volume parameter, control an air volume by controlling a fan by PWM.

The second control module is configured to, based on the target air volume parameter, control the air volume by controlling a resistance value of a resistor connected in series with a fan.

Figure 5:
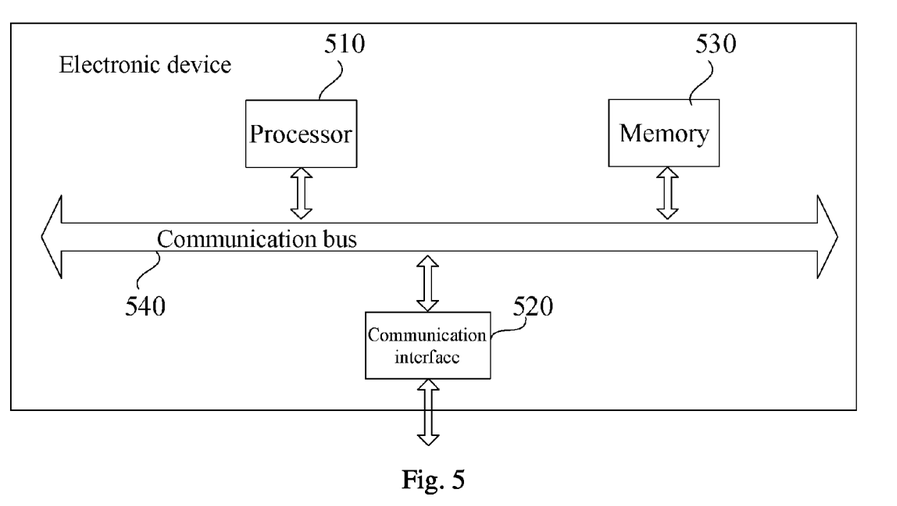
FIG. 5 is a structural diagram of an electronic device provided in the present application.

FIG. 5 shows a physical structural diagram of an electronic device. As shown in FIG. 5, the electronic device may include a processor 510, a communication interface 520, a memory 530 and a communication bus 540. The processor 510, the communication interface 520 and the memory 530 communicate with each other via the communication bus 540. The processor 510 may call logic instructions in the memory 530 to perform an air volume control method for a working machine cockpit. The method includes: acquiring a real-time environment physical parameter, and acquiring a current air volume parameter; determining real-time heat comfort information on the basis of the real-time environment physical parameter and the current air volume parameter; acquiring target heat comfort information; and determining a target air volume parameter on the basis of the real-time heat comfort information, the target heat comfort information, and the current air volume parameter.

In addition, the above-mentioned logic instructions in the memory 530 may be stored in a computer-readable storage medium if implemented in the form of a software functional unit and sold or used as a separate product. With this understanding, the technical solutions of the present application, in essence or for the part contributing to the prior art or for part of the technical solutions, may be embodied in the form of a software product, and the computer software product is stored in a storage medium, and includes a number of instructions configured to cause a computer device (which may be a personal computer, a server, a network device or the like) to perform all or part of the steps of the method described in the embodiments of the present application. The aforementioned storage medium includes: a USB flash disk, a mobile hard disk, a read-only memory (ROM), a random access memory (RAM), a magnetic disk, an optical disk or any of other various media that can store program codes.

In another aspect, the present application further provides a computer program product including a computer program stored in a non-transitory computer readable storage medium, the computer program including program instructions that, when executed by a computer, enable the computer to perform the air volume control method for a working machine cockpit provided in the methods described above. The method includes: acquiring a real-time environment physical parameter, and acquiring a current air volume parameter; determining real-time heat comfort information on the basis of the real-time environment physical parameter and the current air volume parameter; acquiring target heat comfort information; and determining a target air volume parameter on the basis of the real-time heat comfort information, the target heat comfort information, and the current air volume parameter.

In yet another aspect, the present application further provides a non-transitory computer-readable storage medium configured to store a computer program therein, wherein the computer program is implemented when executed by a processor, to perform the air volume control method for a working machine cockpit provided as described above. The method includes: acquiring a real-time environment physical parameter, and acquiring a current air volume parameter; determining real-time heat comfort information on the basis of the real-time environment physical parameter and the current air volume parameter; acquiring target heat comfort information; and determining a target air volume parameter on the basis of the real-time heat comfort information, the target heat comfort information, and the current air volume parameter.

The apparatus embodiment described above is merely schematic, wherein units described as separate components may be or may be not physically separate, and components shown as units may be or may be not physical units, i.e. may be located in one place, and may also be distributed in multiple network units. Some or all of the modules may be selected according to actual needs to achieve the object of the technical solution of this embodiment. They can be understood and implemented by those of ordinary skill in the at without creative effort.

From the above description of implementations, those skilled in the art can clearly understand that the implementations may be achieved by means of software and a necessary general-purpose hardware platform, and of course, may also be achieved by hardware. With this understanding, the technical solutions described above, in essence or for the part contributing to the prior art, may be embodied in the form of a software product, and the computer software product may be stored in a computer readable storage medium, such as an ROM/RAM, a magnetic disk, an optical disc or the like, and includes a number of instructions configured to cause a computer device (which may be a personal computer, a server, a network device or the like) to perform the method described in the embodiments or in parts of the embodiments.

Finally, it is to be noted that the above embodiments are only used for illustrating rather than limiting the technical solutions of the present application. Although the present application is described in detail with reference to the foregoing embodiments, those of ordinary skill in the art should understand that they still can make modifications to the technical solutions disclosed in the foregoing embodiments or make equivalent substitutions to part of technical features thereof; and such modifications or substitutions should not cause the essence of the corresponding technical solutions to depart from the spirit and scope of the technical solutions of the embodiments of the present application.

The invention claimed is:

1. An air volume control method for a working machine cockpit, the method comprising:
   acquiring a real-time environment physical parameter;
   acquiring a current air volume parameter;
   determining real-time heat comfort information on the basis of the real-time environment physical parameter and the current air volume parameter;
   acquiring target heat comfort information;
   determining a target air volume parameter on the basis of the real-time heat comfort information, the target heat comfort information, and the current air volume parameter; and
   controlling an air volume based on the target air volume parameter,
   wherein determining a target air volume parameter on the basis of the real-time heat comfort information, the target heat comfort information, and the current air volume parameter comprises:
   using the real-time heat comfort information, the target heat comfort information, and the current air volume parameter to search a parameterized heat comfort database to obtain the target air volume parameter corresponding to a combination of the real-time heat comfort information, the target heat comfort information, and the current air volume parameter.

2. The air volume control method for a working machine cockpit according to claim 1, wherein determining a target air volume parameter on the basis of the real-time heat comfort information, the target heat comfort information, and the current air volume parameter comprises:
   inputting the real-time heat comfort information, the target heat comfort information, and the current air volume parameter into a parameterized heat comfort model to output the target air volume parameter,
   wherein the parameterized heat comfort model is obtained by training, in advance, using sample real-time heat comfort information, sample target heat comfort information, and a sample current air volume parameter as samples, and using target air volume parameter sample data corresponding to a combination of the sample real-time heat comfort information, the sample target heat comfort information, and the sample current air volume parameter as a sample label.

3. The air volume control method for a working machine cockpit according to claim 1, wherein acquiring target heat comfort information comprises:
   receiving a first input from a user; and
   determining the target heat comfort information in response to the first input.

4. The air volume control method for a working machine cockpit according to claim 1, wherein the real-time environmental physical parameter comprises at least one of: a real-time temperature parameter, a real-time humidity parameter, a personnel heat load parameter, and a personnel clothing heat resistance parameter.

5. The air volume control method for a working machine cockpit according to claim 4, wherein acquiring a real-time environment physical parameter comprises:
   acquiring the real-time temperature parameter by a temperature sensor;
   or acquiring the real-time humidity parameter by a humidity sensor;
   or acquiring a target area image by an image sensor, and determining the personnel heat load parameter or the personnel clothing heat resistance parameter on the basis of the target area image.

6. The air volume control method for a working machine cockpit according to claim 1, the method further comprising:
   controlling the air volume by controlling a fan by Pulse Width Modulation (PWM); or
   controlling the air volume by controlling a resistance value of a resistor connected in series with a fan.

7. An electronic device, comprising a memory, a processor, and a computer program that is stored in the memory and executable by the processor, wherein, when executing the program, the processor performs the steps of the air volume control method for a working machine cockpit according to claim 1.

8. A non-transitory computer-readable storage medium, configured to store a computer program therein, wherein the computer program, when executed by a processor, performs the steps of the air volume control method for a working machine cockpit according to claim 1.

* * * * *